US006753036B2

(12) United States Patent
Jankowski et al.

(10) Patent No.: US 6,753,036 B2
(45) Date of Patent: Jun. 22, 2004

(54) METHOD FOR FABRICATION OF ELECTRODES

(75) Inventors: Alan F. Jankowski, Livermore, CA (US); Jeffrey D. Morse, Martinez, CA (US); Randy Barksdale, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 258 days.

(21) Appl. No.: 09/906,913

(22) Filed: Jul. 16, 2001

(65) Prior Publication Data

US 2003/0013002 A1 Jan. 16, 2003

(51) Int. Cl.$^7$ ................................................ B05D 3/02
(52) U.S. Cl. ........................ 427/189; 427/190; 427/191; 427/192; 29/623.1; 29/623.5
(58) Field of Search ................................ 427/115, 189, 427/190, 191, 192, 250; 429/30, 31, 33, 40, 44; 29/623.1, 623.5; 204/282, 283, 284

(56) References Cited

U.S. PATENT DOCUMENTS

| | | | | |
|---|---|---|---|---|
| 5,114,803 A | * | 5/1992 | Ishihara et al. | ............ 429/30 |
| 5,753,385 A | | 5/1998 | Jankowski et al. | ............ 429/44 |
| 6,007,683 A | | 12/1999 | Jankowski et al. | .... 204/192.17 |
| 6,541,676 B1 | | 4/2003 | Franz et al. | |
| 6,569,553 B1 | | 5/2003 | Koripella et al. | |
| 2002/0081468 A1 | | 6/2002 | Shioya | |
| 2002/0094462 A1 | | 7/2002 | Shioya et al. | |
| 2002/0106540 A1 | | 8/2002 | Shioya | |
| 2003/0190508 A1 | | 10/2003 | Takeyama et al. | |

FOREIGN PATENT DOCUMENTS

WO    WO 99/56333    12/1999

OTHER PUBLICATIONS

Chicago Tribune, By: Jon Van "Space-age Power Nears Reality" Mon, Jun. 5, 2000 Section 4.
Aleks J. Franz et al, High Temperature Gas Phase Catalytic and Membrane Reactors.
Ravi Srinivasan et al, Micromachined Reactors for Catalytic Partial Oxidation Reactions, AIChE Journal, Nov. 1997 vol. 43, No. 11 pp. 3059–3068.
Francis Jones et al, Experimental System for the Study of Gas–Solid Heterogeneous Catalysis in Microreactors, Microfluidic Devices and Systems III Proceedings of SPIE vol. 4177 pp. 124–131.
Tamara M. Floyd et al, Liquid–Phase and Multi–Phase Microreactors for Chemical Synthesis.

* cited by examiner

Primary Examiner—Bruce F. Bell
(74) Attorney, Agent, or Firm—Ann M. Lee; Alan H. Thompson; Eddie E. Scott

(57) ABSTRACT

Described herein is a method to fabricate porous thin-film electrodes for fuel cells and fuel cell stacks. Furthermore, the method can be used for all fuel cell electrolyte materials which utilize a continuous electrolyte layer. An electrode layer is deposited on a porous host structure by flowing gas (for example, Argon) from the bottomside of the host structure while simultaneously depositing a conductive material onto the topside of the host structure. By controlling the gas flow rate through the pores, along with the process conditions and deposition rate of the thin-film electrode material, a film of a pre-determined thickness can be formed. Once the porous electrode is formed, a continuous electrolyte thin-film is deposited, followed by a second porous electrode to complete the fuel cell structure.

9 Claims, 3 Drawing Sheets

METHOD FOR FABRICATION OF ELECTRODES

The U.S. Government has rights in this invention pursuant to Contract No. W-7405-ENG-46 between the U.S. Department of Energy and the University of California for the operation of Lawrence Livermore National Laboratory.

BACKGROUND OF THE INVENTION

The simplest fuel cell comprises two electrodes separated by an electrolyte. The electrodes are electrically connected through an external circuit, with a resistive load lying in between them. Solid polymer electrochemical fuel cells generally employ a membrane electrode assembly, or "MEA," comprising a solid polymer electrolyte membrane, or "PEM," also known as a proton exchange membrane, disposed between the two electrodes. The electrodes are formed from porous, electrically conductive sheet material, typically carbon fiber paper or cloth, that allows gas diffusion. The PEM readily permits the movement of protons between the electrodes, but is relatively impermeable to gas. It is also a poor electronic conductor, and thereby prevents internal shorting of the cell.

A fuel gas is supplied to one electrode, the anode, where it is oxidized to produce protons and free electrons. The production of free electrons creates an electrical potential, or voltage, at the anode. The protons migrate through the PEM to the other electrode, the positively charged cathode. A reducing agent is supplied to the cathode, where it reacts with the protons that have passed through the PEM and the free electrons that have flowed through the external circuit to form a reactant product. The MEA includes a catalyst, typically platinum-based, at each interface between the PEM and the respective electrodes to induce the desired electrochemical reaction.

In one common embodiment of the fuel cell, hydrogen gas is the fuel and oxygen is the oxidizing agent. The hydrogen is oxidized at the anode to form $H^+$ ions, or protons, and electrons, in accordance with the chemical equation:

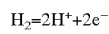

$$H_2 = 2H^+ + 2e^-$$

The $H^+$ ions traverse the PEM to the cathode, where they are reduced by oxygen and the free electrons from the external circuit, to form water. The foregoing reaction is expressed by the chemical equation:

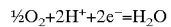

$$\tfrac{1}{2}O_2 + 2H^+ + 2e^- = H_2O$$

Solid Oxide Fuel cells (SOFCs) operate using a mechanism similar to PEMs. The main difference is that instead of the electrolyte material comprising a polymer material capable of exchanging protons, the electrolyte material comprises a ceramic material capable of exchanging electrons.

Electrode layers must be porous in order to allow the fuel and oxidant to flow to the electrode-electrolyte interfaces. Typical fuel cells that use porous electrode materials are bulk structures that require significant manifolding and pressures to readily deliver the fuel to the electrode-electrolyte interface. These porous electrodes are formed by pressing and sintering metal powders to promote adhesion, then sandwiching two such electrodes around an electrolyte layer to form a fuel cell or in series to form the fuel cell stack. A method to fabricate porous electrodes that can reduce or remove the need for high temperatures or high pressures to assist the flow of the fuel and oxidant to the electrode-electrolyte interface may be an important contribution to fuel cell technology.

SUMMARY OF THE INVENTION

Aspects of the invention include a method comprising the steps of

Simultaneously: (1) coating a topside of a porous host structure with a plurality of conductive material particles and (2) flowing gas through a bottom side of the porous host structure to form a conductive porous electrode layer on the topside.

Other aspects of the invention include an electrode comprising a conductive material having a plurality of pores, the electrode having a pore size distribution wherein at least 90% of the total pore volume is in pores of diameter from about 10% below the mode pore diameter to about 10% above the mode pore diameter.

A fuel cell comprising at least one electrode comprising a conductive material having a plurality of pores, the electrode having a pore size distribution wherein at least 90% of the total pore volume is in pores of diameter from about 10% below the size of the mode pore diameter to about 10% above the size of the mode pore diameter.

A fuel cell stack comprising at least one fuel cell having at least one electrode comprising a conductive material having a plurality of pores, the electrode having a pore size distribution wherein at least 90% of the total pore volume is in pores of diameter from about 10% below the size of the mode pore diameter to about 10% above the size of the mode pore diameter.

BRIEF DESCRIPTION OF THE DRAWINGS

The accompanying drawings, which are incorporated into and form a part of the disclosure, are as follows.

DETAILED DESCRIPTION

Figure 1:
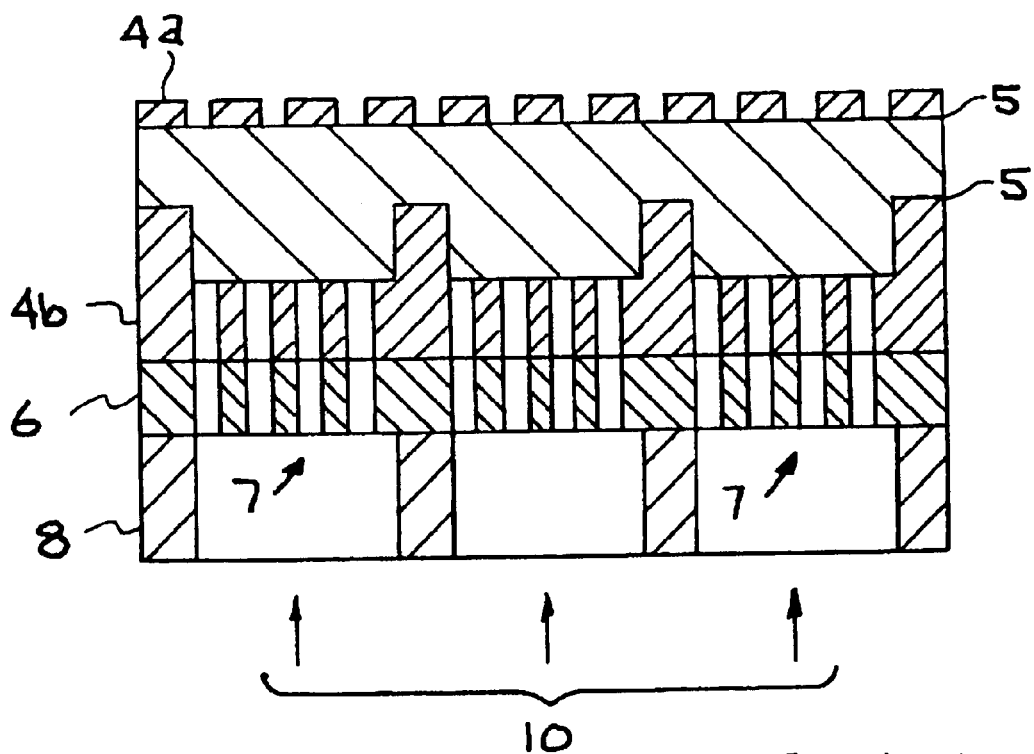
FIG. 1 is an illustration of an electrode-electrolyte-electrode portion of a fuel formed on a host structure that has been mounted to a template.

Fuel cells include, but are not limited to, an anode layer, an electrolyte layer, a cathode layer and optionally catalysts to enhance reaction kinetics. Fuel cell stacks comprise two or more fuel cells connected either in series or in parallel. It is desirable to have porous electrodes so that the fuel and oxidant can easily flow to the respective electrode-electrolyte interface without the need for high temperatures or high pressures to assist the flow. Described herein is a method to form a porous thin-film electrode structure. This approach can be used for all fuel cell electrolyte materials that utilize a continuous electrolyte layer. Moreover, the method can be used to fabricate porous electrodes useful in fuel cells such as, a solid oxide fuel cell (SOFC) and a proton exchange membrane fuel cell (PEMFC) sometimes referred to as a solid polymer fuel cell (SPFC). Power densities measured in output per unit area may be achieved up to about 1 W/cm² for PEMFCs and up to about 2 W/cm² for SOFCs. Typically power densities range from about 0.1 W/cm² to about 0.4 W/Cm². The power output of these fuel cells ranges from about 0.1 Watts to about 50 Watts. Typical outputs range from about 1 Watt to about 10 Watts.

A porous thin-film anode or cathode structure may be formed from a host structure or substrate having a high percentage of continuous open porosity, e.g., greater than 40% by volume (measured by mercury porosimetry). Examples of such substrates include anodized alumina, silicon that has been anisotropically etched, or a polycarbonate film that has been irradiated by heavy ions and selectively etched by potassium hydroxide. The pore sizes in such a structure nominally range from about 0.05 $\mu$m to about 1 $\mu$m in average cross-sectional diameter (measured by scanning electron microscopy or optical microscopy), are closely spaced, and are continuous throughout the substrate/host structure.

Vacuum deposition techniques may be utilized to coat the surface of the host structure with conductive metals, polymers and/or ceramic materials to form the electrode. Some examples of electrode materials include silver, nickel, platinum, and lanthanum-strontium-maganate. Under appropriate process conditions, such a conductive material can be deposited to a thickness where the pores are not completely closed at the top surface of the conductive coating. Subsequent deposition and/or application of a continuous electrolyte layer, and a complimentary porous electrode can complete the fuel cell structure. If the newly deposited electrode on the porous host structure closes off the pores completely, then diffusion of fuel and oxidant through the electrode and electrolyte layers will no longer be possible. The use of conventional vapor deposition techniques necessarily limits the thickness of the deposited electrode to a width on the order of the size of the diameter of the pores of the host structure. The electrode can have an excessively high overall electrical resistance as a consequence of such small dimensions. The resistance of the electrode can be reduced to suitable levels for efficient conduction of current when a conductive film much thicker than the diameter of the pores of the host structure can be deposited onto the host structure.

The thickness of the porous and conductive electrode can be increased when a gaseous material, such as an inert gas, e.g., Argon, at about 0.1 sccm (standard square centimeters per minute) to about 300 sccm, is flowed through the pores of the host structure from the bottomside during the vacuum deposition process. The deposition rate and additional process conditions for the conductive material enable application of an electrode layer that can be constructed to be much thicker in size than the average cross-sectional diameter of the pores of the host structure, thereby significantly reducing the resistance of the electrode. For example, the poor performance that can result from high current, breakdown voltage, resistive losses in thin (less than about 0.1 $\mu$m) metals are eliminated for conductive layers greater than about 0.15 $\mu$m in thickness.

In addition, electrodes having uniform pore size distributions from about 0.1 $\mu$m to about 10 $\mu$m wherein at least 90% of the total pore volume is in pores of diameter from about 10% below the mode pore diameter to about 10% above the mode pore diameter can be obtained. Mode pore diameter is defined as the pore diameter occurring most frequently in any given porous electrode. Tapered pores can also be obtained with this method wherein the size of the two pore openings can be tailored to specific sizes. A tapered pore is a pore with the size of one opening smaller than the size of the other opening. The sizes of the two openings can vary by up to a factor of 10. Features such as pore size and operating temperature will determine the rate at which fuel and oxidant can be passed through the fuel cell. For example, smaller pore sizes can be desirable in a low temperature PEM cell that generates up to about 0.1 watts/cm², whereas larger pore sizes can be desirable in a high temperature SOFC that generates up to about 2 watts/cm². Thus, the ability to tailor the pore size of electrodes to operating temperatures and other parameters of fuel cells can create very efficient energy systems.

Referring to FIG. 1, a continuous electrolyte layer 2 is positioned between two porous electrodes, such as anode 4A and cathode 4B, forming an electrode-electrolyte-electrode portion of a fuel cell or fuel cell stack. Anode and cathode positions can be interchangeable. One embodiment of the method includes a porous host structure 6 having a high density of pores 7 already formed in it. In a further embodiment, host structure 6 may be mounted to a porous template 8. Pore sizes in host structure 6 are typically between about 0.05 $\mu$m and about 1 $\mu$m, calculated as average cross-sectional diameter, whereas pore sizes in template 8 are larger than those of host structure 6, e.g., having average cross-sectional diameters on the order of about 0.1 $\mu$m to about 3 $\mu$m. The direction of fuel flow through the fuel cell as shown by arrows 10, is through pores 7 toward the electrode-electrolyte-electrode interface 5.

Furthermore, electrolyte layer 2 is an insulating material that is ion-conducting or proton conducting. Formation of electrolyte layer 2 can be accomplished by using a physical or chemical vapor deposition method and/or a laminate method. Examples of effective methods include sol-gel, plasma spray, dip coating, tape casting, and evaporation.

Figure 2:
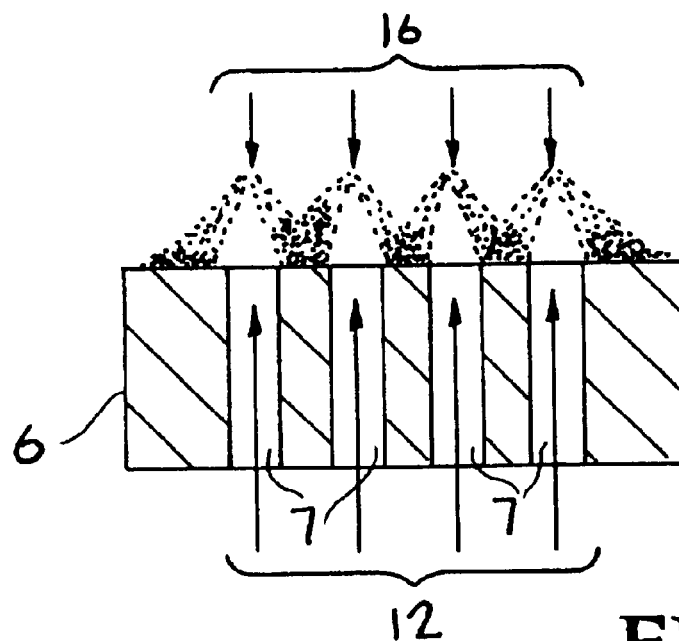
FIG. 2 is an illustration of the simultaneous processes of vacuum deposition and gas flow that form a metal electrode.
Figure 3:
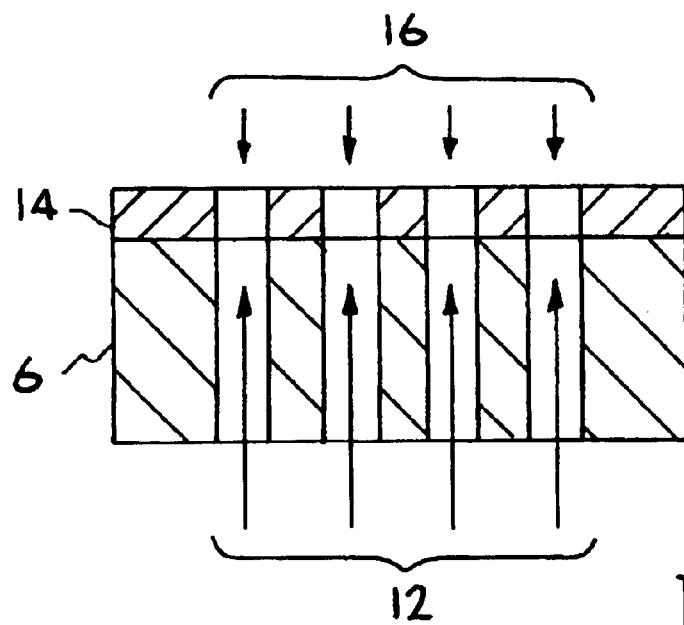
FIG. 3 is an illustration of how a layer of metal greater in thickness than the diameter of the pore size of a porous host structure can be formed.

Referring to FIG. 2, the manner in which the conductive layer is formed is illustrated. Arrows 12 show the direction of gas flow through pores 7. As conductive particles 14 are deposited by vacuum deposition techniques, the gas flow through pores 7 causes a plurality of conductive particles 14 to disperse away from pores 7. The direction of vacuum deposition is shown by arrow 16. FIG. 3 is an illustration of the formation of electrode 4A obtained from the deposition of scattered conductive particles 14 on host structure 6 (the direction of gas flow is shown by arrows 12 and the direction of vacuum deposition is shown by arrows 16).

Figure 4:
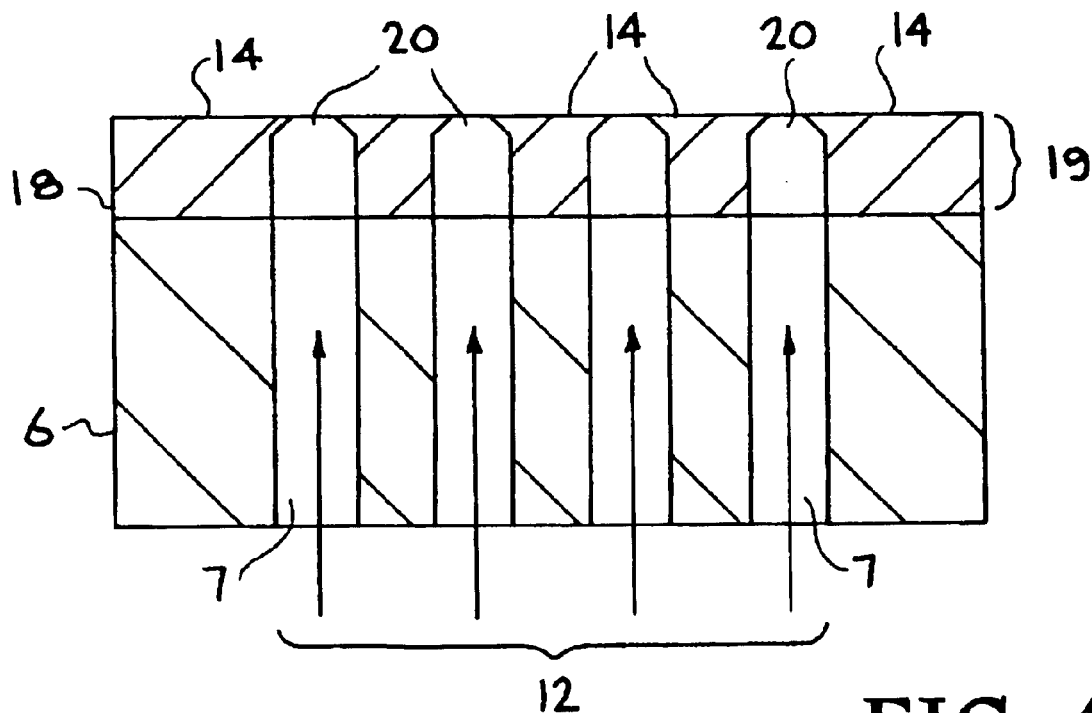
FIG. 4 is an illustration of how the pore is pinched off when forming an electrode after a desired thickness of deposited metal has been achieved.

Another embodiment of the method for depositing the electrode is illustrated in FIG. 4. After an electrode 18 of a desired thickness 19 has been deposited on host structure 6, the rate of gas flow 12 through pores 7 is reduced in order to allow a plurality of sputter deposited conductive particles 14 to narrow down or partially pinch off pores 7 at an orifice distal to host structure 6, i.e., to reduce the orifice dimensions of pores 7 in order to create tapered pores 20.

Figure 5:
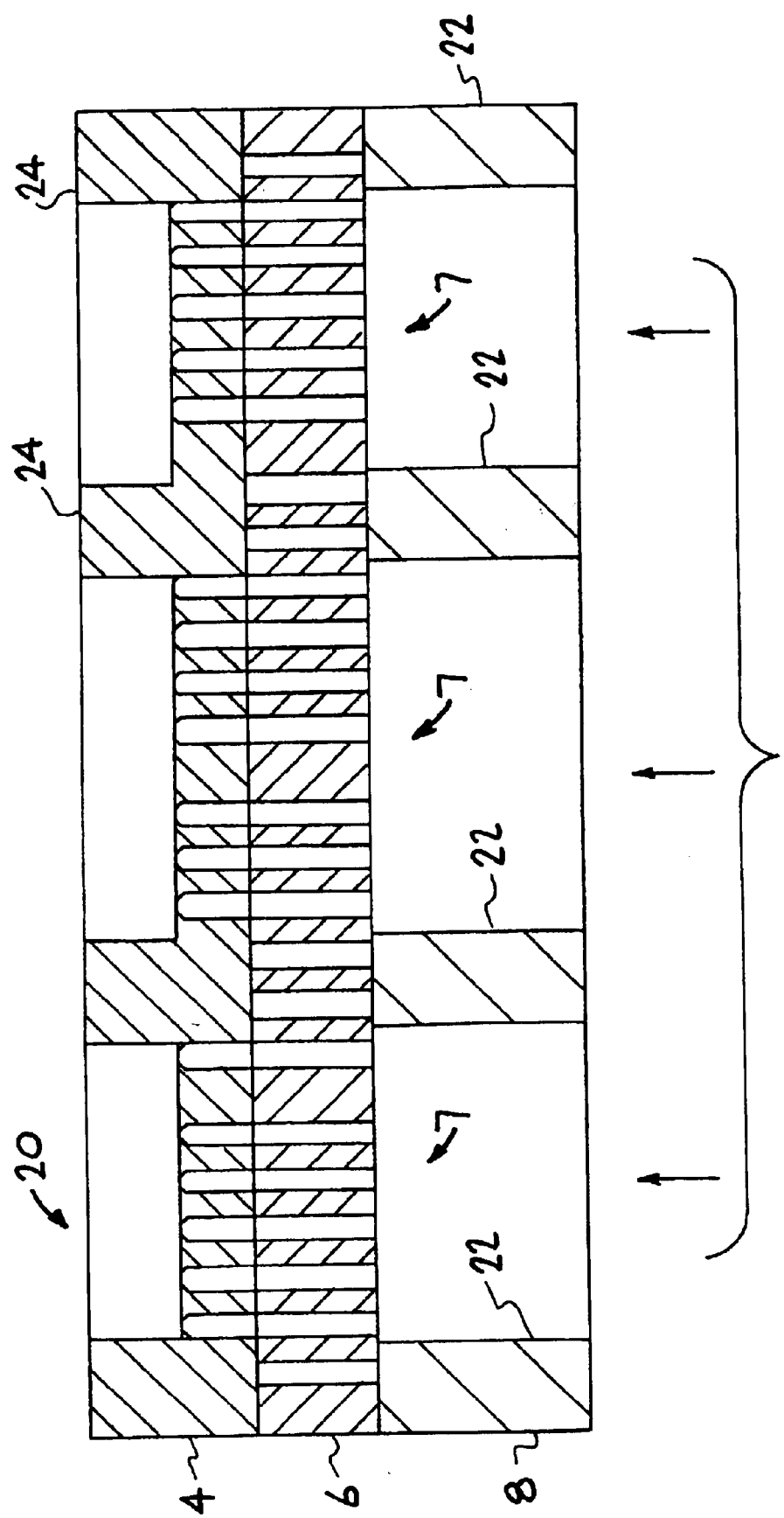
FIG. 5 is an illustration of a metal electrode formed by mounting a porous template to the porous host structure.

Another embodiment of the method of the invention is illustrated in FIG. 5. Porous host structure 6 is mounted on template 8 wherein template 8 has a grid of pores 22 larger in average cross-sectional diameter than that of the pore sizes of host structure 6. Gas flow 12 is prevented from flowing through the pores of host structure 6 because the pores are blocked by grid 22. If the ratio of the area of the blocked pores to unblocked pores is small, the vacuum deposition rate is greater on the surface above grid 22 resulting in an electrode 4 having a thicker layer of conductive particles at such areas 24. The grid pattern is translated to areas of thicker electrode material on a surface having low resistance for conducting current efficiently away from the areas of porous electrode.

The invention claimed is:

1. A method comprising the steps of:
    simultaneously (1) coating a topside of a porous host structure with a plurality of conductive material particles and (2) flowing gas through a bottom side of said porous host structure to form a conductive porous electrode layer on said topside.

2. The method of claim 1, further comprising the steps of:
    allowing the conductive material particles to reach a desired thickness,
    depositing a second plurality of insulating materials that are ion-conducting or proton-conducting to form an electrolyte layer on said porous electrode layer.

3. The method of claim 1, further comprising the step of reducing the flow of said gas through said bottom side after said conductive material particles have reached said desired thickness.

4. The method of claim 1, further comprising the step of mounting to said bottom side of said host structure a template having a grid of pore sizes larger than the pore sizes of the pores of said host structure.

5. The method of claim 1, wherein said porous host structure having pores of average cross-sectional diameter between about .05 $\mu$m and about 1 $\mu$m as measured by scanning electron microscopy.

6. The method of claim 1, wherein said gas is flowed at a predetermined rate in said porous host structure resulting in pores of a predetermined size.

7. The method of claim 1, wherein said gas is flowed at a rate between about 0.1 sccm and about 300 sccm.

8. The method of claim 1, wherein said conductive material particles are deposited by vacuum deposition and at a rate from about 0.1 nm/sec to about 50 nm/sec.

9. The method of claim 4, wherein said pores of said template have an average cross-sectional diameter in the range between about 0.1 $\mu$m and about 3 $\mu$m as measured by scanning electron microscopy.

* * * * *